US006836279B2

(12) United States Patent
Komiya et al.

(10) Patent No.: US 6,836,279 B2
(45) Date of Patent: Dec. 28, 2004

(54) LIGHT BEAM SCANNING APPARATUS AND IMAGE FORMING APPARATUS

(75) Inventors: Kenichi Komiya, Kawasaki (JP); Koji Tanimoto, Tagata-gun (JP); Daisuke Ishikawa, Sunto-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 29 days.

(21) Appl. No.: 10/445,842

(22) Filed: May 28, 2003

(65) Prior Publication Data

US 2004/0239751 A1 Dec. 2, 2004

(51) Int. Cl.[7] .............................................. G03G 21/14
(52) U.S. Cl. ..................................... 347/235; 347/250
(58) Field of Search ................................ 347/234, 235, 347/250

(56) References Cited

U.S. PATENT DOCUMENTS

| 6,208,367 | B1 | 3/2001 | Tanimoto et al. | |
|---|---|---|---|---|
| 6,392,684 | B1 | 5/2002 | Tanimoto et al. | |
| 6,462,855 | B1 | 10/2002 | Komiya et al. | |
| 6,496,212 | B1 | 12/2002 | Tanimoto et al. | |
| 6,509,921 | B2 | 1/2003 | Komiya et al. | |
| 6,611,279 | B2 | 8/2003 | Komiya et al. | |
| 6,639,620 | B2 * | 10/2003 | Ishikawa et al. | 347/235 |
| 2002/0105574 | A1 | 8/2002 | Tanimoto et al. | |
| 2004/0100551 | A1 * | 5/2004 | Komiya et al. | 347/234 |

FOREIGN PATENT DOCUMENTS

JP    2001-10112 A    1/2001

* cited by examiner

Primary Examiner—Huan Tran
(74) Attorney, Agent, or Firm—Foley & Lardner LLP

(57) ABSTRACT

The sensors SP and SO detect a position in the sub-scanning direction through which a light beam scanned by the scanning unit passes. The correction pulse generator corrects the amplitude of the position signal obtained by the sensors SP and SO. The integrator integrates the position signal corrected by the correction pulse generator, and outputs the integration value corresponding to the sub-scanning direction position. The CPU 51 adjusts the correction amount of the correcting unit (the amplitude of the pulse) such that the integration value output from the integrator falls within a target range. The target range is varied in accordance with the light beam position that changes due to an influence caused by a change in the surrounding temperature or the like.

16 Claims, 12 Drawing Sheets

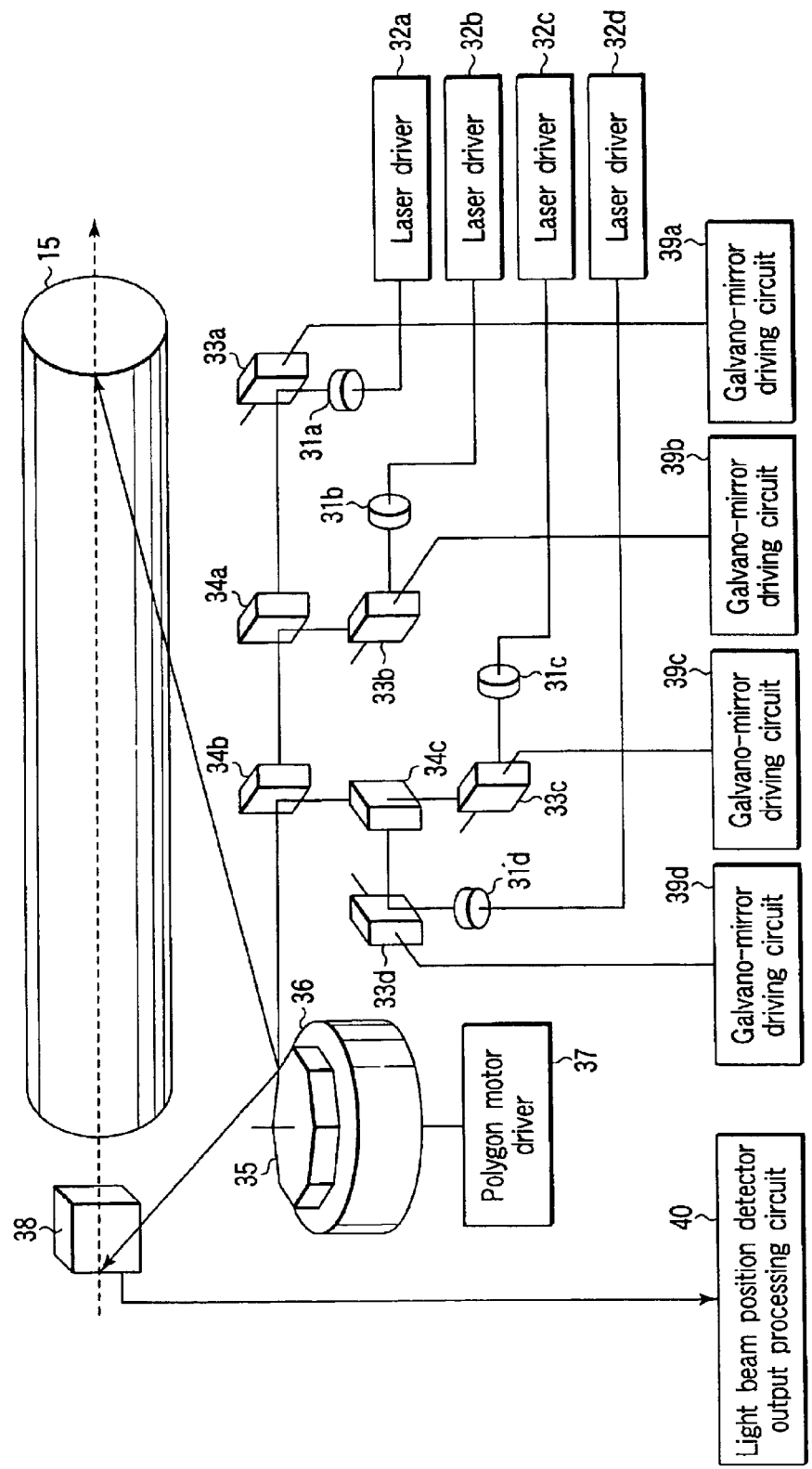
F I G. 2

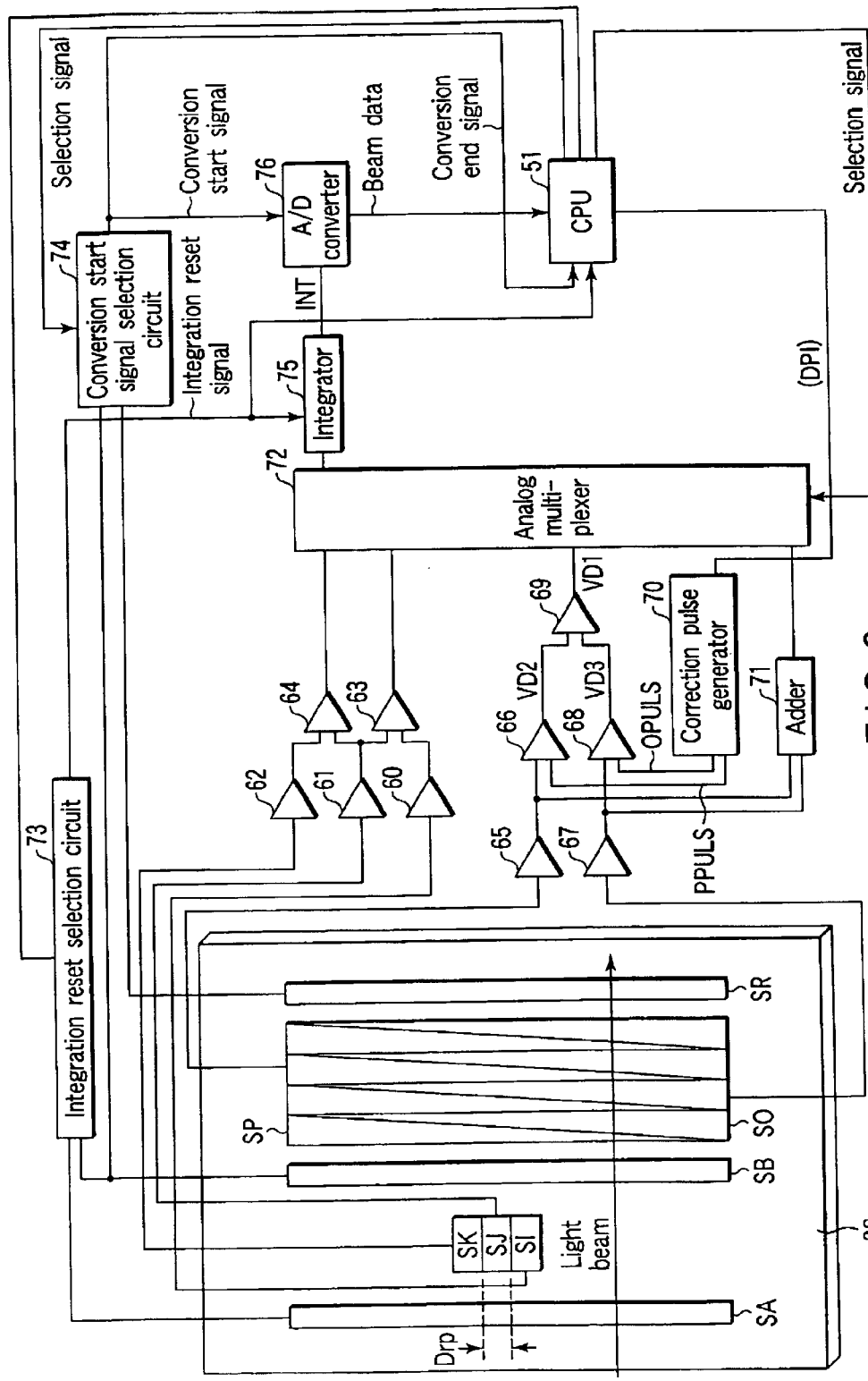
F I G. 6

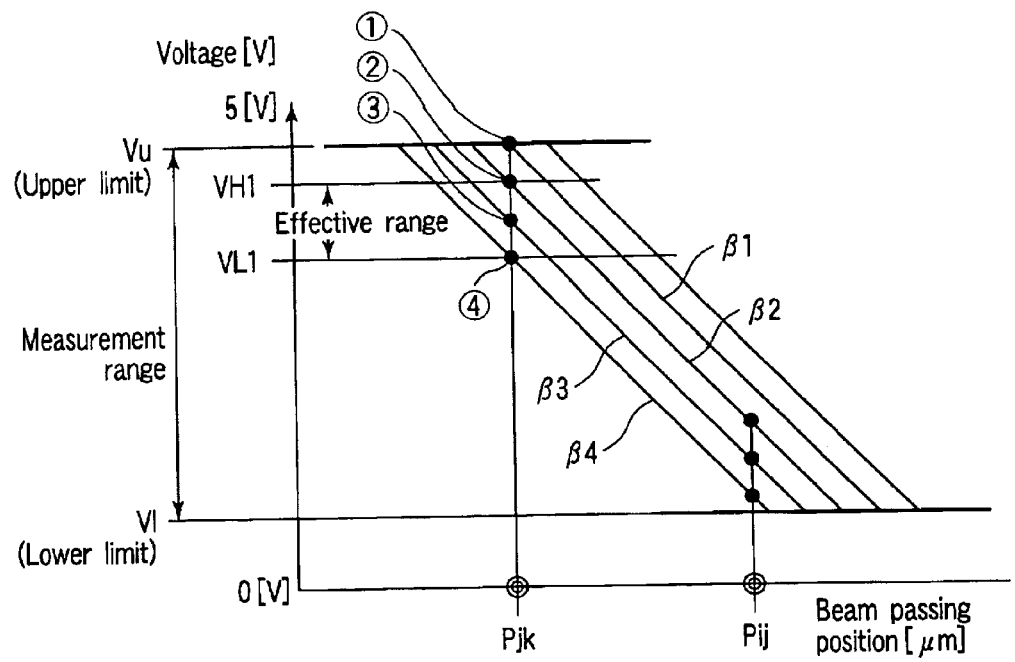
F I G. 8
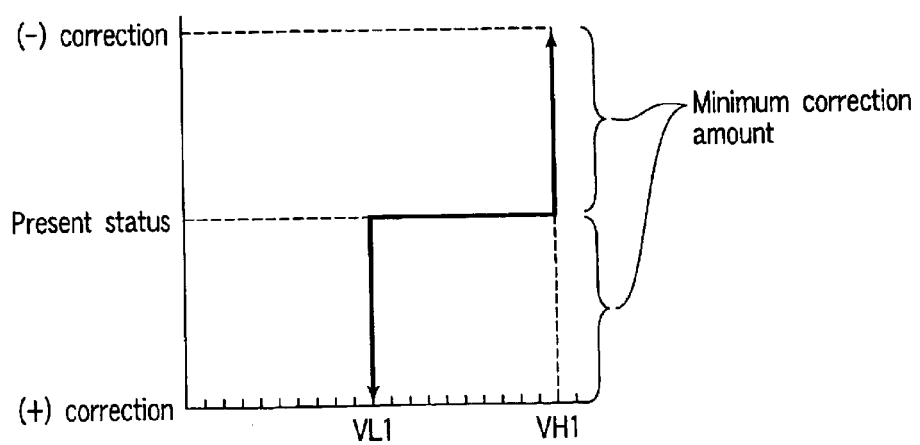
F I G. 9

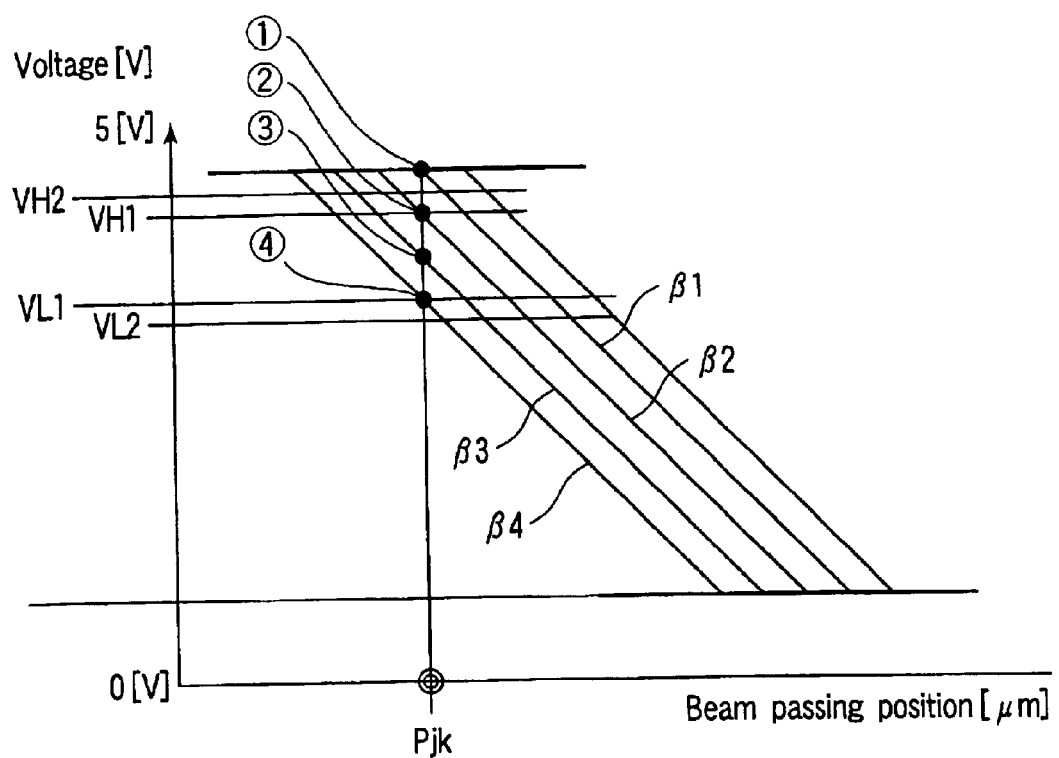
F I G. 10
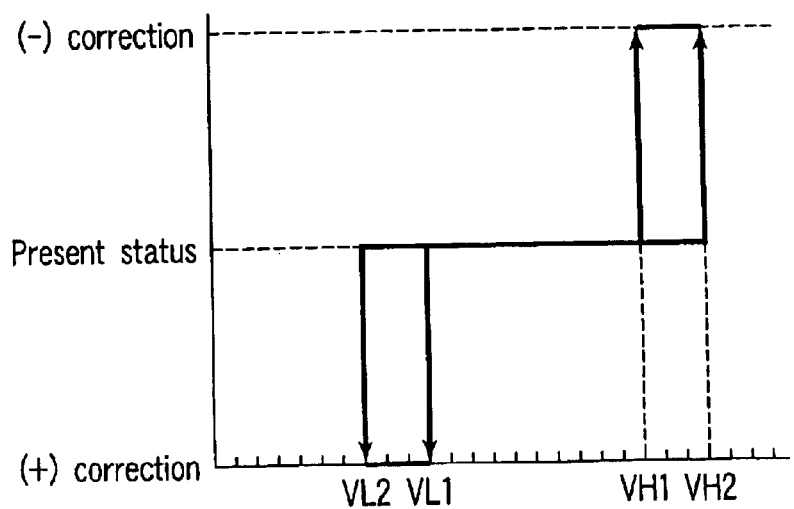
F I G. 11

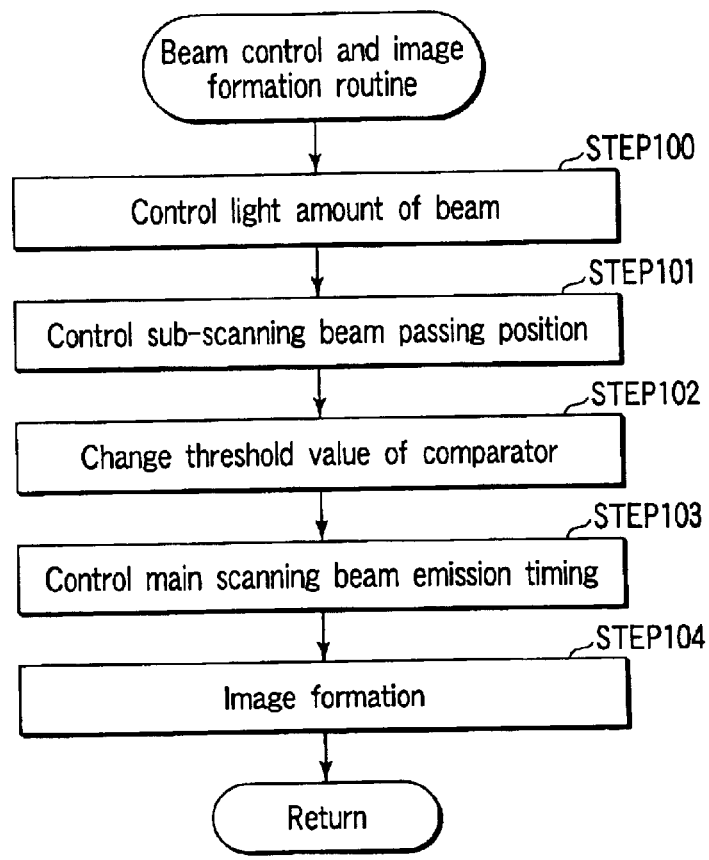
F I G. 14
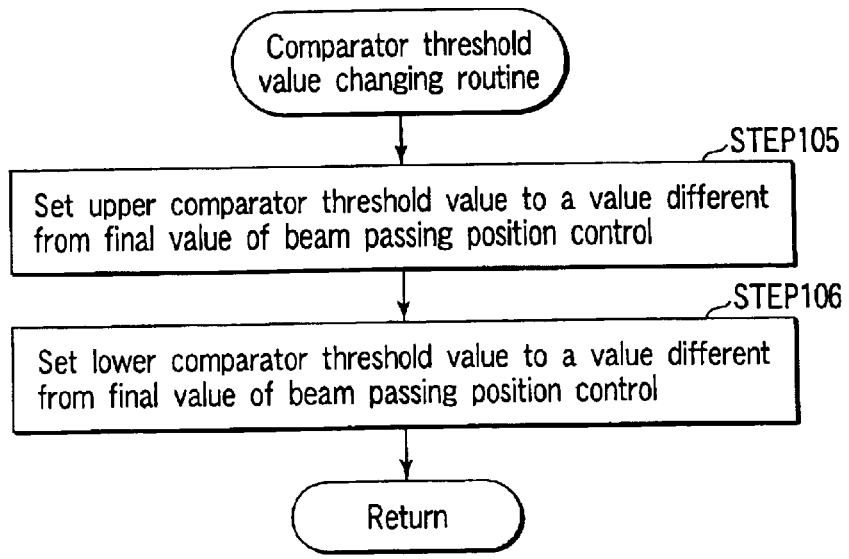
F I G. 15

LIGHT BEAM SCANNING APPARATUS AND IMAGE FORMING APPARATUS

BACKGROUND OF THE INVENTION

The present invention relates to an image forming apparatus such as a digital photocopier in which the photosensitive drum is scanned by a plurality of laser beams at the same time while copying, and thus a static latent image is formed on the photosensitive drum.

Recently, various types of digital photocopiers that form images by scanning exposure surface with a laser beam and by the electrophotographic process have been developed. More recently, in order to increase the speed of image formation, a multi-beam type digital photocopier has been developed, in which a plurality of laser beams are generated and a plurality of lines are simultaneously scanned at each time with these laser beams.

Such a multi-mean type digital photocopier includes a plurality of semiconductor laser oscillators that generate laser beams, a galvano-mirror that controls a sub-scanning directional position of each laser beam output from those laser oscillators, a polygon mirror that directs each laser beam reflecting on the galvano-mirror to further reflect it towards the photographic drum, thereby scanning the photosensitive drum with each laser beam, and a lens-system unit mainly consisting of a collimator lens and an f-θ lens.

In order to form an image at an accurate location on a sheet, the exposure positions in both of the main scanning direction and sub-scanning direction must be accurately adjusted, especially in the case of the multi-beam type apparatus. Usually, the adjustment of the beam scanning position is carried out at the time of a so-called warming-up state in which the power is turned on and each part of the apparatus is initialized, a stand-by state in which the warming-up is completed and the apparatus is ready to copy, and a state immediately before copying, that is, when the copy start button is pushed.

In the multi-beam type digital photocopier described above, the beam position in the sub-scanning direction and the beam position in the main scanning direction are controlled with regard to each laser beam, and thus the positional error of each beam is adjusted within several $\mu$m. The adjustment of the beam position in the sub-scanning direction is carried out by giving an instruction value to the galvano-mirror until the error becomes an allowance value or less. The adjustment of the beam exposure position in the main scanning direction is carried out by a pixel clock generation circuit and a delay circuit serving to delay the pixel clock by the unit of a fraction of an exposure time for one pixel. In general, it requires a relatively long processing time to adjust the beam scanning position in multi-beam type digital photocopiers, and therefore there is a demand for shortening this adjustment processing time.

BRIEF SUMMARY OF THE INVENTION

Under the above-described circumstances, the object of the present invention is to shorten the time required to adjust the beam scanning position and thereby to improve the overall copying processing capability of the apparatus.

In order to achieve the above object, according to one aspect of the present invention, there is provided a light beam scanning apparatus comprising:

a beam generating unit configured to generate a light beam;

a scanning unit configured to reflect the light beam generated from the beam generating unit to a surface to be scanned, and scanning the surface to be scanned with the light beam in a main scanning direction;

a beam passing position detecting unit configured to detect a passing position of the light beam in a sub-scanning direction, which is scanned by the scanning unit and provide a position signal that indicates the passing position;

a correcting unit configured to correct the position signal from the passing position detecting unit and provide corrected position signal; and an adjusting unit configured to adjust a correction amount of the correcting unit such that the corrected position signal falls within a target range, the target range being variable in accordance with the position of the light beam.

BRIEF DESCRIPTION OF THE SEVERAL VIEWS OF THE DRAWING

FIG. 2 is a diagram showing the structure of an optical system unit 13 and the position of a photosensitive drum 15 relative to the unit;

FIG. 6 is a block diagram showing the structure of the beam position detection circuit according to the first embodiment of the present invention;

FIG. 8 is a diagram illustrating the threshold value for switching the correction value in the conventional technique;

FIG. 9 is a diagram illustrating the threshold value for switching the correction value in the conventional technique;

FIG. 10 is a diagram illustrating the threshold value for switching the correction value in the first embodiment of the present invention;

FIG. 11 is a diagram illustrating the threshold value for switching the correction value in the first embodiment;

FIG. 14 is a flowchart of the operation from the beam control to the image formation when the second embodiment is applied;

FIG. 15 is a flowchart illustrating the operation of changing the threshold value of a window comparator.

DETAILED DESCRIPTION OF THE INVENTION

Figure 1:
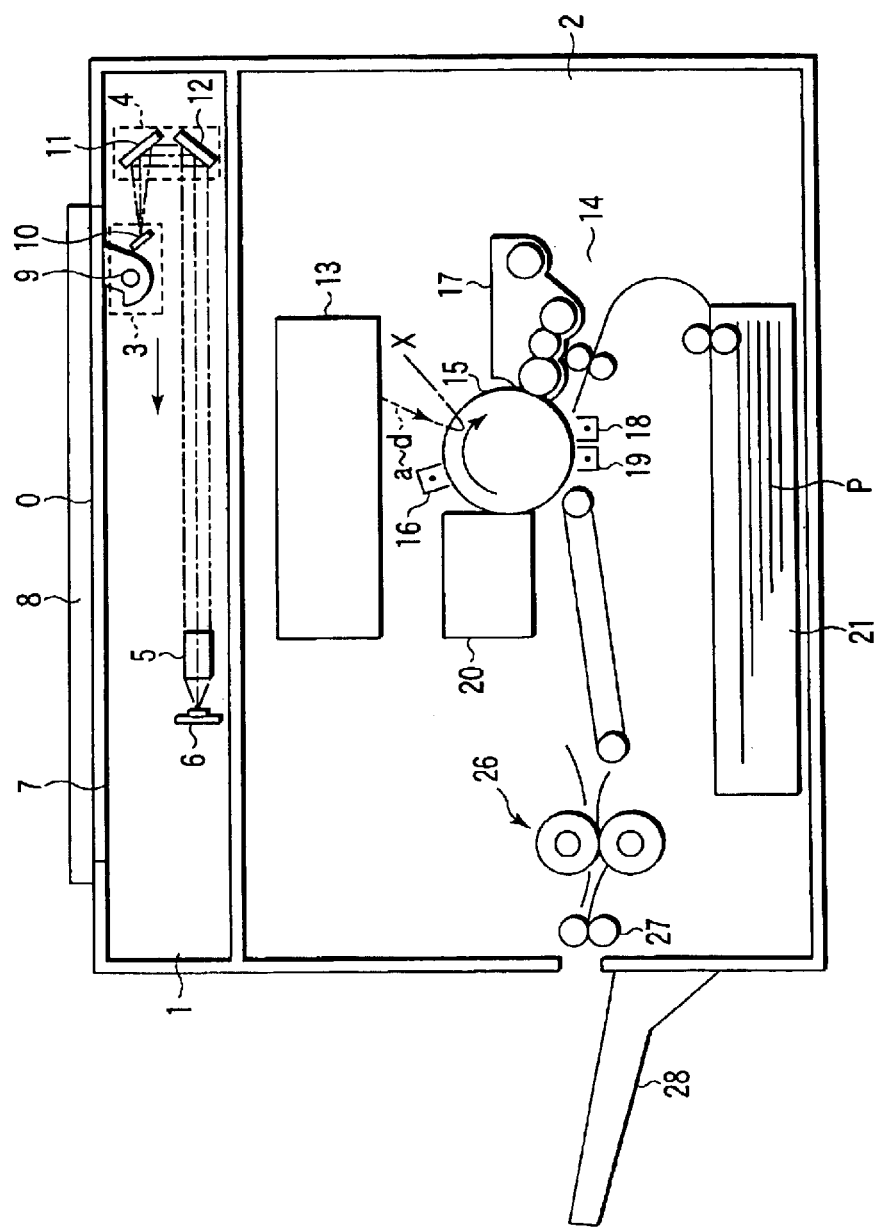
FIG. 1 is a block diagram showing the structure of a digital photocopier as the image forming apparatus according to an embodiment of the present invention.

FIG. 1 is a block diagram showing the structure of a digital photocopier, as an example of the image forming apparatus according to an embodiment of the present invention. The digital photocopier includes a scanner unit 1 serving as image reading means and a printer unit 2 serving as image forming means.

The scanner 1 includes a first carriage 3 and a second carriage 4, which are movable in the direction indicated by the arrow in the figure, an image forming lens 5, an optical/electrical converting element 6 and the like. An original sheet O is placed to face downward, on an original sheet table 7 made of transparent glass, and the standard position where the original sheet O is supposed to be placed for centering is set to the right-hand side of the front surface of the original table 7 in the short-side direction.

The original sheet O is pressed onto the original sheet table 7 with an original sheet fixing cover 8 that is provided openable/closable.

The original sheet O is lit up by a light source 9, and its reflection light is concentrated on a light receiving surface of the optical/electrical converting element 6 via mirrors 10, 11 and 12 and the image forming lens 5. The image on the original sheet O placed on the original sheet table 7 is read line by line in succession by a scanner unit 1, and thus read output is converted into an 8-bit digital image signal indicating the density of the image, in an image processing unit, which is not shown in the figure.

The printer unit 2 includes an image forming unit 14 which is constituted of an optical unit 13 and an electrophotographic system that can form an image on a sheet P which is a medium on which an image is to be formed. With this structure, the image signal read from the original sheet O with the scanner unit 1 is processed by the image processing unit (not shown), and then converted into a laser beam (to be called "light beam" hereinafter) from a semiconductor laser oscillator. In this embodiment, a multi-beam optical system that uses a plurality of (two or more) semiconductor laser oscillators is employed.

A plurality of light beams output from the optical system unit 13 form an image as a scanning light spot having a necessary resolution at a point of an exposure position X on the photosensitive drum serving as an image carrier, and thus a scanning exposure is carried out. In this manner, a static latent image that corresponds to the image signal is formed on the photosensitive drum 15.

In the periphery of the photosensitive drum 15, an electrostatic charger 16 for charging the surface of the drum, a developer unit 17, an image transfer charger 18, a separation charger 19, a cleaner 20 and the like are provided. The photosensitive drum 15 is rotated at a predetermined outer circumferential speed by a drive motor (not shown), and it is charged by the electrostatic charger 16 placed to face the surface of the drum. A plurality of light beams form a spot of image at the point of the exposure position X on the photosensitive drum 15 that has been charged.

The static latent image formed on the photosensitive drum 15 is developed with toner (developing agent) supplied from a developer unit 17. The photosensitive drum 15, on which a toner image is formed by the development, controls the timing with a paper feeding system at the point of the image transfer position, and thus the toner image is transferred with the transfer charger 18 onto a sheet P supplied from a paper feeding cassette 21. The toner image transferred on the sheet P is fixed to the paper with a fixing unit 26. Then, the sheet P is fed out onto an external paper output tray 26 through a feed-out roller 27.

Next, the optical system unit 13 will now be described.

FIG. 2 illustrates the structure of the optical system unit 13 and the position of the photosensitive drum 15 relative to the unit 13. The optical system unit 13 includes semiconductor laser oscillators 31a, 31b, 31c and 31d built in the unit, which serve as, for example, four optical beam generating means. Each of the semiconductor laser oscillators 31a to 31d carries out image formation by one scanning line all at the same time, and thus it is possible to form images at high speeds without having to significantly increase the number of rotations of the polygon mirror.

More specifically, the laser oscillator 31a is driven by a laser driver 32a, and an output light bam is allowed to pass through a collimator lens, which is not shown in the figure, and then made incident on the galvano-mirror 33a serving as optical path changing means. The light beam reflecting on the galvano-mirror 33a is allowed to pass through a half mirror 34a and a half mirror 34b, and then it is made incident on a polygon mirror serving as a polyhedral rotation mirror.

The polygon mirror 35 is rotated at a constant speed by a polygon motor 36, which is driven by a polygon motor driver 37. In this manner, reflecting light from the polygon mirror 35 is scanned in a certain direction at an angular speed determined by the rotation number of the polygon motor 36. The optical beam scanned by the polygon mirror 35 passes through an f-θ lens, which is not shown in the figure, and due to the f-θ characteristics of the lens, the beam having passed the lens is scanned at a constant speed onto the light receiving surface of the light beam detection device serving as light beam passing detection means and light beam position detection means, as well as onto the photosensitive drum 15. The other three light beams go through the same process as described above, and therefore the explanations for them will not be repeated here. The light beams output from the individual laser oscillators 31a, 31b, 31c and 31d are synthesized together by the half mirrors 34a, 34b and 34c, and thus the four light beams are directed towards the polygon mirror 35.

In this manner, the four optical beams can be scanned onto the photosensitive drum 15 at the same time, and therefore, provided that the rotation number of the polygon mirror 35 is the same as the conventional one, it is possible to record an image at a speed 4 times faster than the case of the conventional single beam technique.

The galvano-mirrors 33a, 33b, 33c and 33d are designed to adjust (control) the positions of the light beams directed in the sub-scanning direction with relative to each other, and they are connected respectively to galvano-mirror driving circuits 39a, 39b, 39c and 39d that drive the mirrors.

The optical beam detection device 38 is designed to detect the passing position, passing timing and power of each of the four optical beams, and it is provided in the vicinity of the end portion of the photosensitive drum 15 such that the light receiving surface of the device is leveled with the surface of the photosensitive drum 15. On the basis of the detection signals from the optical beam detection device 38, the control of the galvano-mirrors 33a, 33b, 33c and 33d, which correspond to the respective light beams, (that is, the control of the image formation position in the sub-scanning direction), the control of the light generation power (intensity) of each of the laser oscillators 31a, 31b, 31c and 31d, and the control of the light emission timing (that is, the control of the image formation position in the main scanning direction), are carried out. In order to create signals for carrying out these controls, the light beam detection device 38 is connected to a light beam detection device output processing circuit 40.

Next, the control system will now be described.

Figure 3:
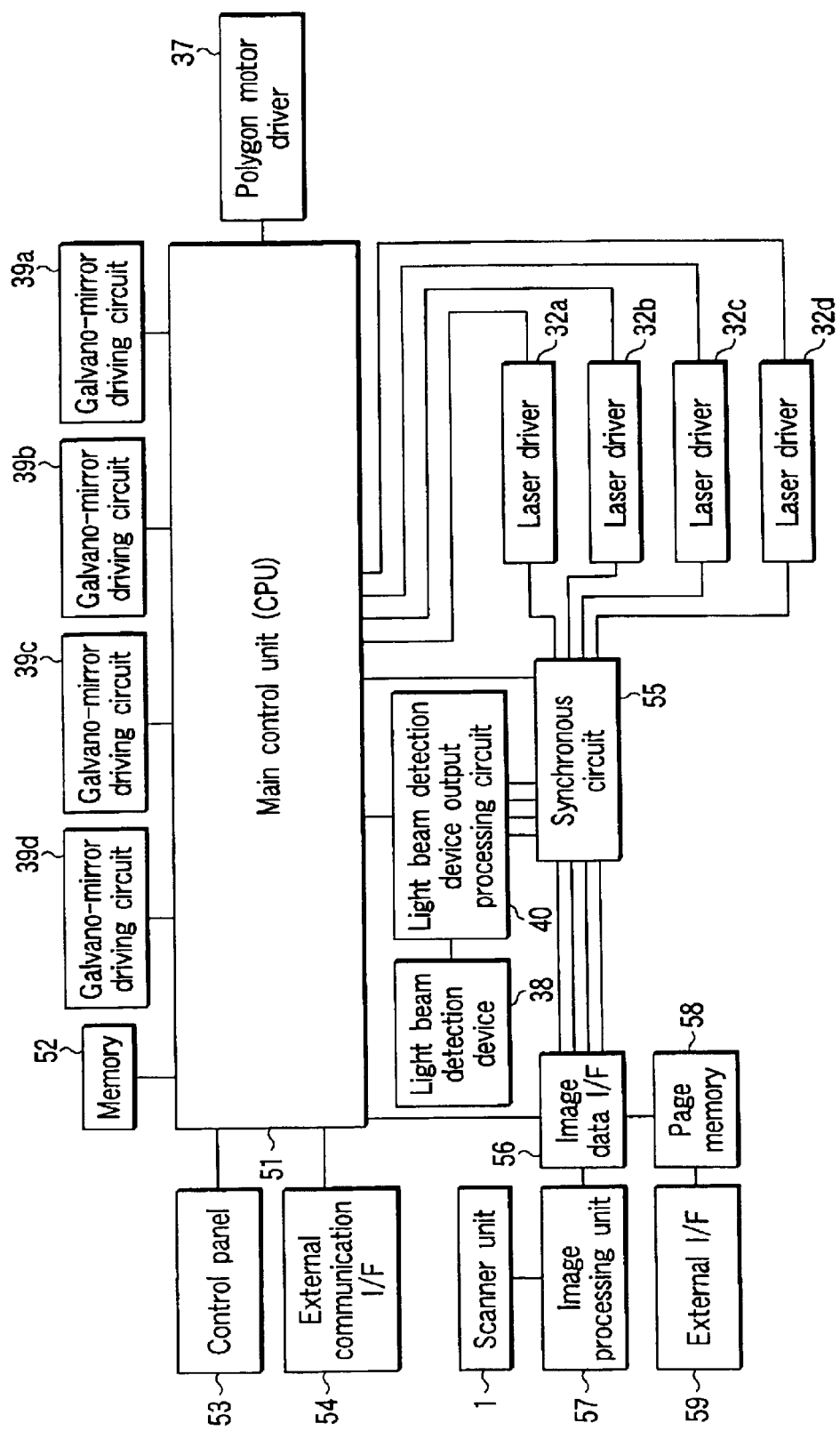
FIG. 3 is a diagram showing the structure of a control system that mainly serves to control an multi-beam optical system.

FIG. 3 shows the control system that mainly controls the multi-beam optical system. More specifically, a main control unit 51 that controls the entire system, is, for example, a CPU, and it controls, as an integral system, all of a memory 52, a control panel 53, an external communication interface (I/F) 54, laser drivers 32a, 32b, 32c and 32d, a polygon mirror motor driver 37, a galvano-mirror driving circuits 39a, 39b, 39c and 39d, a light beam detection device output processing circuit 40 serving as signal processing means, a synchronous circuit 55, an image data interface (I/F) 56 and the like. The synchronous circuit 55 is connected to the image data I/F 56, and the image data I/F 56 is connected to an image processing unit 57 and a page memory 58. The image processing unit 57 is connected to the scanner unit 1, and the page memory 58 is connected to an external interface (I/F) 59.

Here, the flow of image data when forming an image will now be briefly explained.

First, in the case of the copying operation, as described before, an image on an original sheet O set on the original sheet table 7 is read with the scanner unit 1 and transferred to the image processing unit 57. The image processing unit 57 carries out, on the image signal from the scanner unit 1, for example, a conventional shading correction, various types of filtering processes, a gradation process and a gamma correction.

The image data from the image processing unit 57 is transferred to the image data I/F 56. The image data I/F 56 serves a role of distributing the image data to the four laser drivers 32a, 32b, 32c and 32d.

The synchronous circuit 55 generates a clock that is in synchronous with the timing of each light beam when passing through the optical beam detection device 38, and outputs the image data as a laser modulation signal from the image data I/F 56 in synchronous with the clock to the laser drivers 32a, 32b, 32c and 32d. The control panel 53 is a man-machine interface used to initiate a copying operation, set the number of copies, and the like.

Thus, as image data is transferred in synchronism with the scanning of each light beam, the image formation can be carried out at a right position.

The galvano-mirror driving circuits 39a, 39b, 39c and 39d are circuits used to drive the galvano-mirrors 33a, 33b, 33c and 33d in accordance with the instruction values from the main control unit 51. With this structure, the main control unit 51 can freely control the angle of each of the galvano-mirrors 33a, 33b, 33c and 33d by means of the galvano-mirror driving circuits 39a, 39b, 39c and 39d. The main control unit 51 controls the galvano-mirror driving circuits 39a, 39b, 39c and 39d such that the sub-scanning directional passing positions of the light beams are set at desired locations when they are detected by the optical beam detection device 38, which will be later explained.

The polygon motor driver 37 is a driver that drives the polygon motor 36 used to rotate the polygon mirror 35 that scans the above-described four light beams. The main control unit 51 can start and stop the polygon motor driver 37 and switch the rotation number of the motor. Switching of the rotation number is carried out when the recording pitch (resolution) is changed.

Other than generating laser beams in accordance with the laser modulation signals in synchronism with the scanning of the light beam from the synchronous circuit 55 described before, the laser drivers 32a, 32b, 32c and 32d have the functions of rendering the laser oscillators 31a, 31b, 31c and 31d respectively and independently to emit light compulsorily regardless of image data, in accordance with a compulsory light emission signal from the main control unit 51.

This function in which each of the laser oscillators 31a, 31b, 31c and 31d is compulsorily rendered to emit light, is used in order to control the exposure scanning position by the light beam or control the light beam power.

Further, the main control unit 51 controls the setting of each of the laser drivers 32a, 32b, 32c and 32d so that the light emission powers of the laser oscillators 31a, 31b, 31c and 31d are equalized. The setting of the light emission powers is varied in accordance with variation in the processing conditions, detection of the positions where light beams pass through, and the like.

Figure 4:
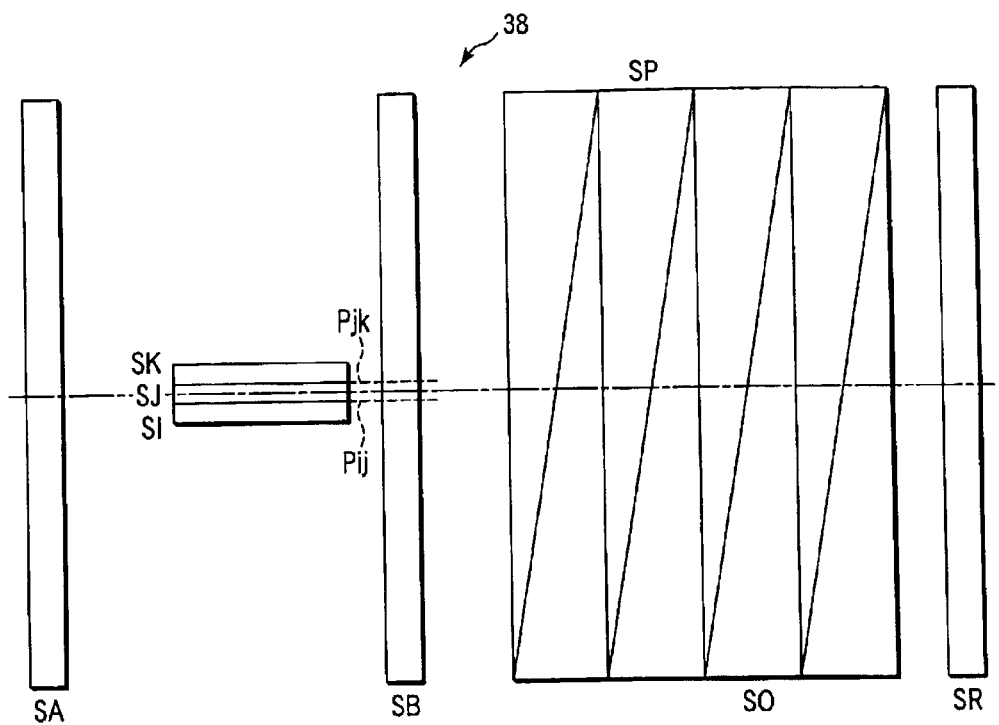
FIG. 4 is a diagram showing an enlarged view of a light receiving portion of a beam passing position detecting sensor 38 used in the multi-beam optical system.

FIG. 4 is an enlarged view of the light receiving portion of a conventional beam passing position detection sensor 38 used in the multi-beam optical system. Reference symbols SA, SB, SI, SJ, SK, SO, SP and SR are optical/electrical converting elements (photodiodes), each of which, upon receiving light, outputs an electrical current that proportionally corresponds to the amount of light. The function of the light receiving portion will now be described.

The timing sensor SA generates an integration reset signal for an integrator that integrates outputs from the beam passing position detection sensors SI, SJ and SK. Further, it generates an integration reset signal for an integrator that integrates outputs from the beam passing position detection sensors SO and SP.

The timing sensor SR generates a conversion start signal used for A/D conversion of the integrated outputs of the beam passing position detection sensors SI, SJ and SK. Further, it generates a conversion end signal that notifies the CPU of the finishing of the A/D conversion and the timing for capturing the data after the A/D conversion. Furthermore, the timing sensor SR generates a conversion start signal used for A/D conversion of the integrated outputs of the beam passing position detection sensors SO and SP, and it generates a conversion end signal that notifies the CPU of the finishing of the A/D conversion and the timing for capturing the data after the A/D conversion.

The beam passing position detection sensors SI, SJ and SK detect the beam passing position in the sub-scanning direction on the basis of the difference between outputs from the sensors SI and SJ, and the difference between outputs from the sensors SJ and SK. The sub-scanning direction is a direction normal to the scanning direction of light beam (the main scanning direction) scanned by the polygon mirror 35, and is a direction in which the surface of the photosensitive drum 7 moves. The sensors SI, SJ and SK are arranged at the same pitches (spaces) in the sub-scanning direction. Thus, by controlling the beam passing positions to be set at the center position Pij between SI and SJ, and the center position Pjk between SJ and SK, the beam passing positions can be set at the above pitch.

The beam passing position detection sensors SO and SP are each made of a sawtooth-shaped photodiode (each of SO and SP being one photodiode), and the position where a beam passes in the sub-scanning direction is detected on the basis of the difference between outputs from SO and SP.

Next, the control of the spaces between a plurality of beams scanned by the polygon mirror 35 to be equal to each other with use of the galvano-mirror 33 will now be briefly described.

The sensors SK and SJ (the first position confirmation unit) are placed away from the beam passing position detection sensors SO and SP in the main scanning direction. These sensors are placed on the region that includes the first passing target position (position Pjk) and are designed to confirm that a light beam is passing through the first passing target. The sensors SJ and SI (the second position confirmation unit) are on the region that includes the second passing target position (position Pij) to be away from the first passing target position (position Pjk) in the sub-scanning direction by a predetermined distance. These sensors are designed to confirm that a light beam is passing through the second passing target. The predetermined distance mentioned above is a value corresponding to the resolution and it is, for example, 42.3 $\mu$m or its multiples.

The control unit 51 includes a beam passing position changing unit for changing the passing position of one or more of those light means in the sub-scanning direction by controlling the galvano-mirror 33. The control unit 51 calculates out a first difference between an integral value of a difference between outputs from the beam passing position detection sensors SO and SP when a light beam passes through the first passing target (, that is, an output from an integrator 75, which will be described later), and an integral value of a difference between outputs from the beam passing position detection sensors SO and SP when the light beam passes through the second passing target (, that is, an output from an integrator 75, which will be described later).

Further, in order to equalize a second difference that indicates the difference in the integral value of the difference between outputs from the beam passing position detection sensors SO and SP for the first light beam and second light beam of those light beams, to the first difference, the control unit 51 controls the beam passing position changing unit to change the passing position of the second light beam. The control unit 51 is capable of changing the passing position of each of the other light beams than the first light beam, and the first light beam is a fixed light beam whose sub-scanning directional position is fixed. It should be noted here that the details of the control and adjustment of a plurality of scanning beams to set them at predetermined constant spaces are described in the U.S. Pat. No. 6,509,921 that has been assigned to the same assignee as that of the present application.

Figure 5:
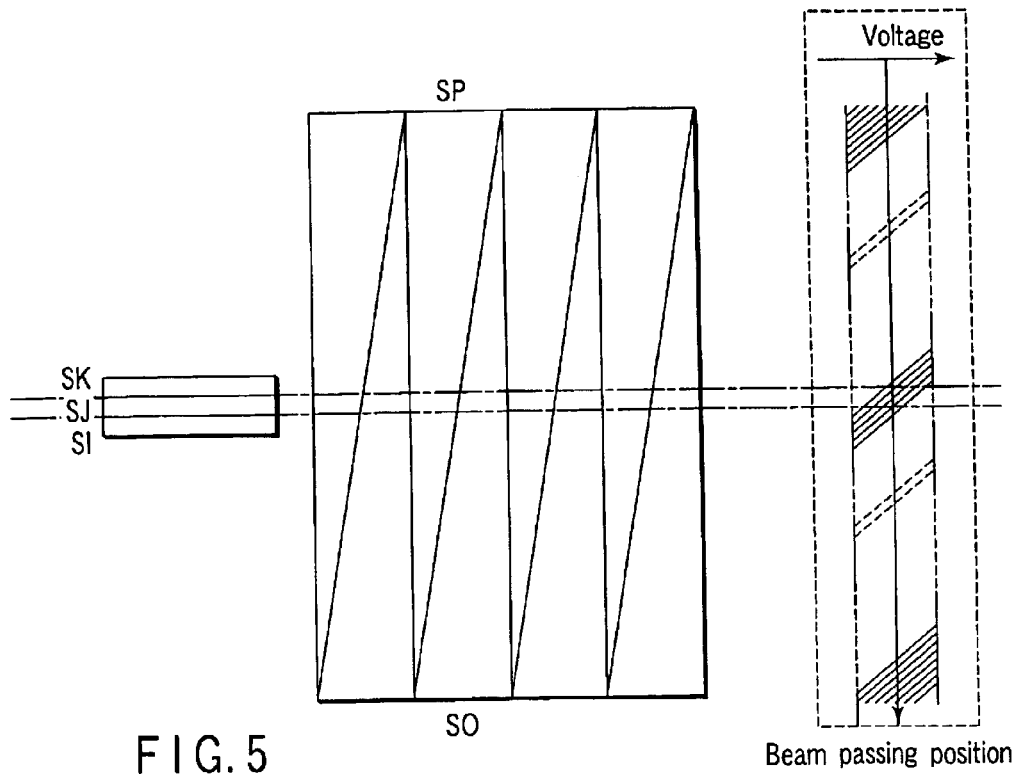
FIG. 5 is a diagram showing a relationship between the beam passing position detecting sensors SO and SP and the beam detection characteristics of the sensors.

FIG. 5 is a diagram showing the beam passing position detecting sensors SO and SP and the relationship between the beam detection characteristics of the sensors. FIG. 6 is a block diagram showing the structure of the beam position detection circuit according to the first embodiment.

Light detection outputs from the sensors SI, SJ and SK are current/voltage-converted by current/voltage (I/V) converters 60 to 62, respectively, and then supplied to differential amplifiers 63 and 64. The differential amplifier 63 outputs a difference between outputs detected by the sensors SI and SJ, whereas the differential amplifier 64 outputs a difference between outputs detected by the sensors SJ and SK. The outputs from the differential amplifiers 63 and 64 are supplied selectively by an analog multiplexer 72 to the integrator 75, where the outputs are integrated.

The light receiving portions of the beam passing position detection sensors SO and SP are formed to have a large size in the sub-scanning direction so as to be able to detect the passing positions of beams in a wide range. However, at the same time, the beam passing positions must be detected at a high accuracy. Therefore, with the correction system shown in FIG. 6, the detection range is switched occasionally, thereby making it possible to satisfy the demand for "detecting a wide range at a high accuracy". More specifically, in accordance with the passing positions of beams, an appropriate detection range is selected, and then the beam detection and control are carried out. (That is, from a plurality of detection characteristic graphs shown in FIG. 5, an appropriate one is selected in accordance with the beam passing positions.)

In order to detect a beam passing position at a high accuracy, the sensitivity of the beam detection system (the voltage value with regard to the beam moving distance in the sub-scanning direction) should be increased. The sensitivity of the beam detection system can be improved by, for example, increasing the amount of light of the scanning beam or the amplification rate of the I/V converter or differential amplifier. However, in these measures, the output voltage of the electric circuit that constitutes the beam passing position detection system is limited. Therefore, although it is possible to detect a position at a high accuracy, a wide range detection cannot be carried out. (This is because the output voltage of the detection system reaches the upper or lower limit of the circuit even if the beam moving distance is small.)

Under the circumstances, a sensor output correction system capable of a wide range detection while maintaining the sensitivity at the same level has been proposed. The reason why the output voltage of the detection system reaches the upper or lower limit of the circuit is that the sensor output of either one of the sensors SO and SP is so that that the differential output reaches or becomes close to the power voltage or the ground voltage. Therefore, in order to prevent the above-described drawback, it suffices if the excessively large sensor output is decreased to such a level that the integral output does not reach the upper or lower limit of the circuit. In other words, the correction system subtracts the correction pulse amplitude from the sensor output of either one of the sensors SO and SP, and thus prevents the integral output from reaching the upper or lower limit of the circuit.

The operation of the circuit shown in FIG. 6 in this embodiment will now be described. Here, the circuit operation will be discussed in connection with an assumed example case where the light bam passes through a position lower than the center position between a pair of sensor patterns SP and SO.

First, the beam position detection process is carried out in such a state that the correction pulse amplitude from the correction pulse generation circuit 70 is set at a reference value, that is, a no correction state. With this beam position detection process, an output signal INT from the integrator 75 is supplied to the main control unit (CPU) 51 via the A/D converter 76. The CPU 51 judges if the correction is necessary or not on the basis of whether or not the output signal INT from the integrator 75 is close to the power voltage (Vmax) or ground level (Vmin).

In the case where it is judged that the correction is necessary in the above judgment, the CPU 51 judges the output of which one of the sensor patterns SP and SO requires the correction. When the output signal from the integrator 75 is close to the power voltage (for example, 5V) (that is, Vmax), it is determined by the CPU 51 that the output from the sensor pattern SP should be corrected. Further, when the output signal from the integrator 75 is close to the ground level (that is, Vmin), it is determined by the CPU 51 that the output from the sensor pattern SO should be corrected.

To summarize, in the circuit shown in FIG. 6, when the output signal from the integrator 75 is close to the power voltage (Vmax), the output from the sensor pattern SP is connected, whereas when the output signal from the integrator 75 is close to the ground level (Vmin), the output from the sensor pattern SO is connected. Here, let us suppose that the output from the sensor pattern SO needs be corrected.

The CPU 51 transmits a control execution signal indicating that the correction pulse generation circuit 70 should be controlled for correction, and a sensor selection signal indicating a correction control object, for example, indicating that an output from the sensor pattern SO should be corrected.

Further, the CPU 51 transmits data indicating the amplitude of the correction pulse to the correction pulse generating circuit 70. The value indicated by this data may be selected from preset values or it may be of a type varies gradually from a predetermined initial value.

The correction pulse generating circuit 70 is designed such as to supply the correction pulse only to the output from the sensor pattern SO upon such an instruction from the CPU 51. In this case, the correction pulse signal to the output from the sensor pattern SP is set at a reference voltage. In this manner, the output from the sensor pattern SP is not corrected.

Figure 7:
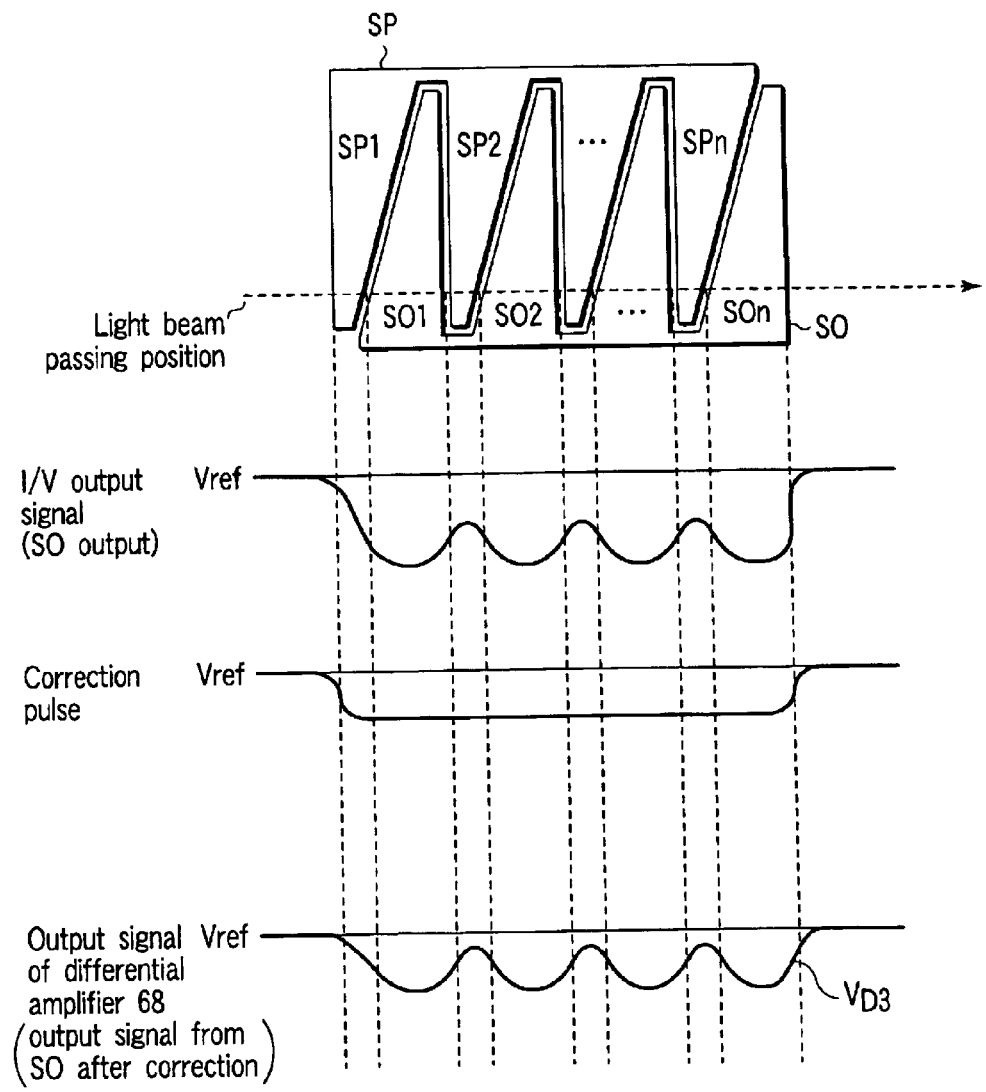
FIG. 7 is a diagram illustrating the operation of a correction pulse generating circuit 70.

When the setting is finished, the circuit shown in FIG. 6 carries out the position detection when the light beam passes through the sensor similarly once again. That is, the correction pulse generating circuit 70 DA-converts the data from the CPU 51, and generates a correction pulse OPULS such as shown in FIG. 7 when the light beam passes through the sensor SA. Thus generated correction pulse OPULS is input to the differential amplifier 68. On the other hand, the sensor patterns SP and SO generate current outputs as light beam pass. The current outputs from the sensor patterns SP and SO are converted into voltage signals by the current/voltage conversion amplifiers 65 and 67, and then input to the differential amplifiers 66 and 68.

The differential amplifier 68 calculates a difference VD3 between the output voltage of the current/volume conversion amplifier 67 of the sensor SO and the correction voltage as the correction pulse OPULS transmitted from the correction pulse generating circuit 70.

The differential amplifier 66 calculates a difference VD2 between the output voltage of the current/volume conversion amplifier 65 of the sensor SP and the reference voltage PPULS transmitted from the correction pulse generating circuit 70. Here, if the amplification rate of the differential amplifier 66 is one, the difference VD2 becomes equal to the output voltage of the current-voltage conversion amplifier 65.

Next, the differential amplifier 69 calculates a difference VD 1 between VD2 and VD3. The result of this calculation is input to the integrator 75 via the analog multiplexer 72. The integrator 75 integrates the output voltage from the differential amplifier 70.

Similarly, in the case where the light beam passing position is upper than the center position of the sensor, the correction pulse generating circuit 70 is set to correct only the output from the sensor pattern SP side by the CPU 51. That is, the correction pulse PPULS becomes a correction voltage as a correction value, and the correction pulse OPULS becomes a reference voltage for no correction. In this manner, only the output signal from the sensor pattern SP is corrected.

As described above, the output signals of the position detection sensors SO and SP are corrected with use of the correction pulse on the basis of the correction value determined by the CPU 51 so that the output of the integrator will not be saturated. Thus, even if the amplification rate of the current/voltage conversion amplifier has been increased or the integration constant of the integrator is set to be more sensitive, the output signal indicating the light beam passing position can be normally obtained without making the output of the integrator saturated. The graph illustrated in the right-hand side on FIG. 5, that illustrates a plurality of characteristics shows the beam passing position-detection characteristics in the case where the correction value (correction pulse amplitude value) is gradually varied, that is, the output characteristics of the integrator 75 shown in FIG. 6.

Thus, the amplitude of the correction pulse (OPULS or PPULS) is adjusted in accordance with the beam passing position, thereby making it possible to detect beams in a wide range while maintaining a high detection accuracy. Further, basically, the correction pulse amplitude value is subtracted from the output of the sensor having a large output; however it is also possible to have such a structure of always correcting one of the sensors by rendering the correction pulse to have positive and negative polarities. It should be noted here that the details of the system of detecting beam positions in a wide range at a high accuracy are described in the U.S. patent application Ser. No. 09/816, 773 that has been assigned to the same assignee as that of the present application.

FIG. 8 is a diagram showing a part of the characteristics of the detection of the positions of the light beams by the sensors SO and SP. In the graph, the horizontal axis indicates the beam passing position, and the vertical axis indicates the differential output integration value (that is, the output voltage from the integrator 75) INT of the sensors SO and SP.

Further, Vu represents the measurable upper limit voltage of the circuit system and Vl represents the measurable lower limit voltage of the circuit system. Within a measurement range between Vu and V1 (Vu–Vl), the position of the beam in the sub-scanning direction is detected. The voltage Vu is smaller than the power voltage (for example, 5V), whereas Vl is a voltage larger than the ground level (for example, 0V).

$\beta 01$ to $\beta 4$ indicate the beam position detection characteristics obtained when the amplitude of the correction pulse is varied (that is, the correction value is varied) by means of the correction pulse generator 70. (Here, each characteristic is called correction characteristic graph.) For example, when the beam passing position is at Pjk (, which is the center position between the sensors SK and SJ), $\beta 1$ to $\beta 4$ indicate outputs ① to ④, respectively. If the resolution of the D/A converter (not shown) in the correction pulse generator 70 is further improved, it is also possible to insert a graph between adjacent correction characteristic graphs. In order to detect the beam passing position Pjk, any one of $\beta 1$ to $\beta 4$ is selected; however the following problem will occur in a practical use.

For example, in the case where the correction characteristic graph is $\beta 1$, its output is at the same level as that of the upper limit value Vu, it cannot be used in a practical sense. Further, in the case where the sensors shown in FIG. 5 are employed, both of the center position Pjk between the sensors SK and SJ and the center position Pij between the sensors SJ and SI must fall within the measurement range of the sensor outputs. However, in practice, there is a lower limit in the outputs of the sensors SO and SP when the beam passes through the center position Pjk, for example. Without the lower limit, it is possible that the outputs from the sensors SO and SP, when the beam passes through the center position Pij, becomes lower than the lower limit (vl) of the circuit system, causing a measurement of center position Pij impossible and may damage a signal processing IC that is provided in a later stage.

In consideration of the above, the effective range of the differential output integration value of the sensors SO and SP when the beam passes through the center position Pjk is between the upper limit VH1 and lower limit VL1. The CPU 51 selects such a correction characteristic graph (setting a correction value) that the differential output integration value INT of the sensors SO and SP when the beam passes through the center position Pjk falls between the upper limit value VH1 and lower limit value VL1. For example, the CPU 51 selects β3.

However, the correlation between the beam passing position Pjk and β3 is not always constant. For example, as the D/A output, which is a correction value, varies due to the temperature and changes over time, or the circuit constant of the correction pulse generating unit that generates correction pulses varies, the correlation between the beam passing position and the correction characteristic graph β3 is changed.

For example, in the case when the characteristic changes from what is indicated by β3 to such a characteristic indicated by β2, since the differential output integration value INT of the sensors is equal to or higher than the upper limit value VH1, the CPU reduces (minus (−) correction) the correction value by a minimum correction amount so that the differential output integration value INT of the sensors falls once again within the effective range. In the manner, the differential output integration value INT of the sensors is reduced by the minimum correction amount. On the other hand, in the case when the characteristic changes from what is indicated by β3 to such a characteristic indicated by β4, since the differential output integration value INT of the sensors is equal to or lower than the lower limit value VL1, the CPU increases (plus (+) correction) the correction value so that the differential output integration value INT of the sensors falls once again within the effective range. In the manner, the differential output integration value INT of the sensors is increased by the minimum correction amount.

FIG. 9 is a diagram illustrating the concept of the control method, where the vertical axis indicates the correction value supplied to the correction pulse generator 70 and the horizontal axis indicates the differential output integration value INT of the sensors. The above-described operation is repeated and thus the CPU adjusts the correction value so that the output of the integration value INT of the sensors falls within the effective range when the beam passing position is at the center position Pjk.

However, the above-described method entails the following problem.

In the case where the beam position detection characteristic is β4 and the beam passes at the center position Pjk, the differential output integration value INT of the sensors SP and SO (, that is, the output from the differential amplifier 69) is at the lower limit value VL1 in the effective range, and therefore the CPU carries out a plus correction. However, when the variation in the amplitude of the correction pulse from the correction pulse generator 70 is excessively large due to an influence by the temperature or the like, the correction characteristic graph β4, which should be changed to β3, is, in some cases, changed to β2 at one stroke. In these cases, the CPU judges that the differential output integration value INT has become equal to or more than the upper limit value VH1, and therefore the CPU, this time, carries out a minus correction.

If the above-described problem occurs during the control carried out between paper sheets, the CPU 51 cannot find a correction characteristic graph that can detect the beam passing position and the operation lapse into a detection error. The term, the control between paper sheets, is used to indicate various types of control including the beam position control, which is carried out between the end of the printing of a sheet and the start of the printing of the subsequent sheet during the continuous copy mode. If such an error occurs during the beam control at the worming up operation of the apparatus, the control (position detection) is repeated to the time limit, and eventually the apparatus lapses into a time-out error. As a result, it becomes impossible to detect the beam passing position or control the beam passing position to a predetermined position.

Figure 12:
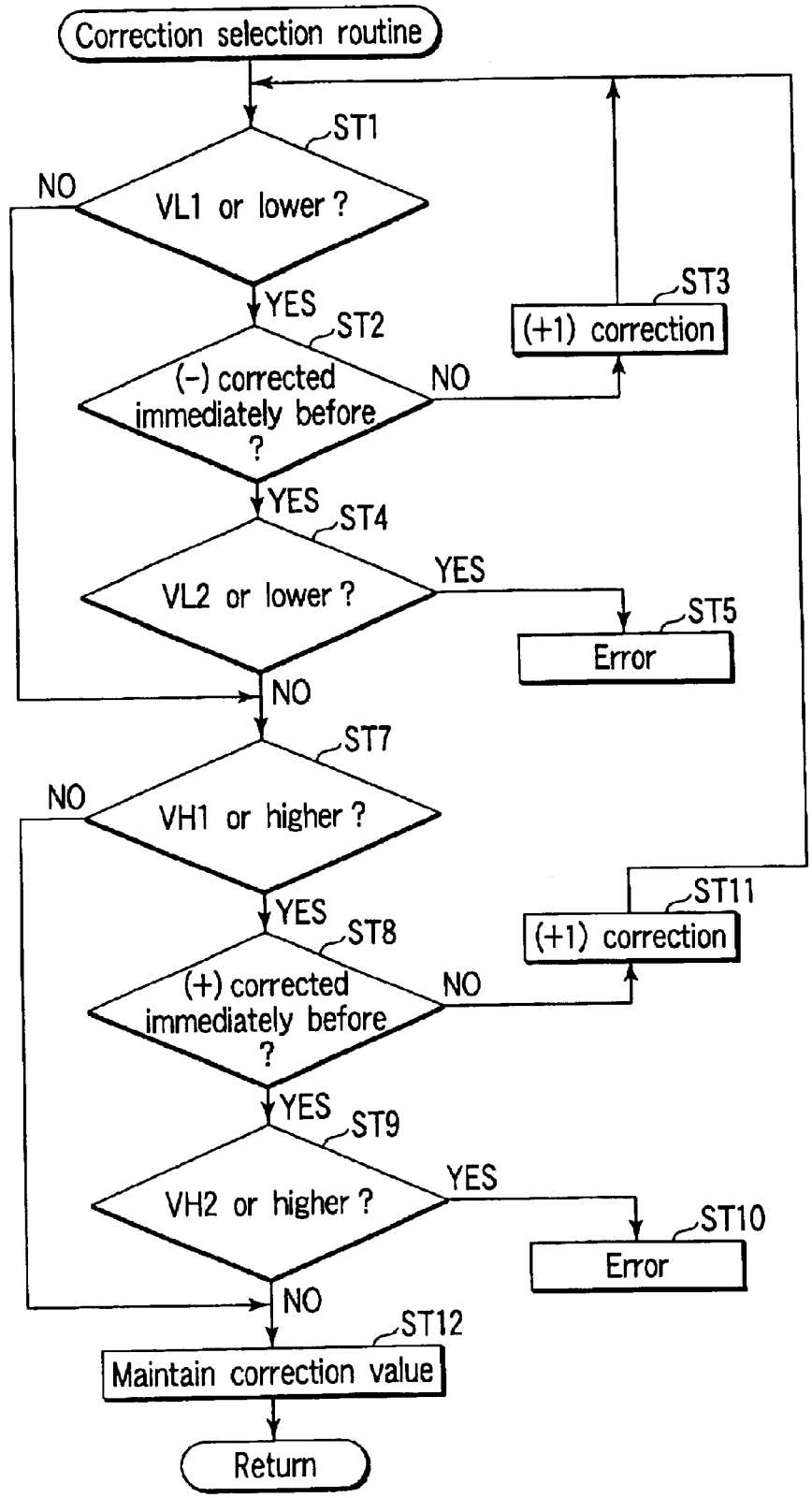
FIG. 12 is a flowchart illustrating the operation of the first embodiment.

In this embodiment, the above-described problem is solved by providing a plurality of values (threshold values) for judging the effective range for each of the upper limit and lower limit values. With reference to FIGS. 10, 11 and 12, a detailed explanation will now be provided. FIG. 10 shows a part of the beam passing position detection characteristics that explain this embodiment. FIG. 11 is a diagram showing the concept of the control method according to this embodiment, and FIG. 12 is a flowchart illustrating the operation of the embodiment.

Let us suppose that the above-described problem occurred in FIG. 10. More specifically, when the beam position is Pjk and the correction characteristic graph is β4, the CPU judges that the differential output integration value INT has already reached the lower limit value VL1 of the effective range (, that is, Yes in Step ST1), and carries out a plus (+) correction as in ST3. (In this case, a minus (−) correction is not carried out immediately before, that is, No in ST2.) In this time, if the change in the amplitude of the correction pulse from the correction pulse generator 70 is excessively large due to an influence of the temperature or the like, the correction characteristic graph β4 is changed to β2 at one stroke, and as a result, the integration value goes beyond the upper limit value VH1 of the effective range (, that is, the case of No in ST1 and Yes in ST7). At this point, the CPU judges if a plus (+) correction is carried out immediately before as in ST8 (in this case, Yes), and as long as the integration value does not become equal to or higher than the upper limit value VH2 as in ST9, the correction value is maintained as in ST12. That is, the CPU 51 changes the upper value of the effective range to VH2 (VH2>VH1). If it is equal to or higher than VH2 in ST9 (, that is, the case of Yes), the apparatus lapses into a system error, and the error contents are displayed on a display portion of the control panel 53. With this operation, even if the correction characteristic graph is β2, it becomes possible to detect the beam position. Therefore, it is possible to avoid the situation in which there is no graph found to detect the beam passing position, where (+) and (−) corrections are repeated.

After that, when the beam position is Pjk and the correction characteristic graph is β2, the CPU judges that the differential output integration value INT has become the upper limit value VH1 of the effective range (, that is, NO in Step ST1 and Yes in ST7), and carries out a minus (−) correction as in ST11. (In this case, a plus (+) correction is not carried out immediately before, that is, No in ST8.) In this time, if the change in the amplitude of the correction pulse from the correction pulse generator 70 is excessively large due to an influence of the temperature or the like, the correction characteristic graph is changed to β4 at one stroke, and as a result, the integration value becomes equal to or lower than the lower limit value VL1 of the effective range (, that is, the case of Yes in ST1). At this point, the CPU judges if a (−) correction is carried out immediately before as in ST2 (in this case, Yes), and as long as the integration value does not become equal to or lower than the lower limit value VL2 (that is, the case of No in ST4), the correction value is maintained as in ST12. That is, the CPU 51 changes the lower value of the effective range to VL2 (VL2<VL1). If it is equal to or lower than VL2 in ST4 (, that is, the case of Yes), the apparatus lapses into a system error, and the error contents are displayed on a display portion of the control panel 53. With this operation, even if the correction characteristic graph is β4, it is still possible to avoid the situation in which there is no graph found to detect the beam passing position, where (+) and (−) corrections are repeated.

Next, the second embodiment of the present invention will now be described.

Figure 13:
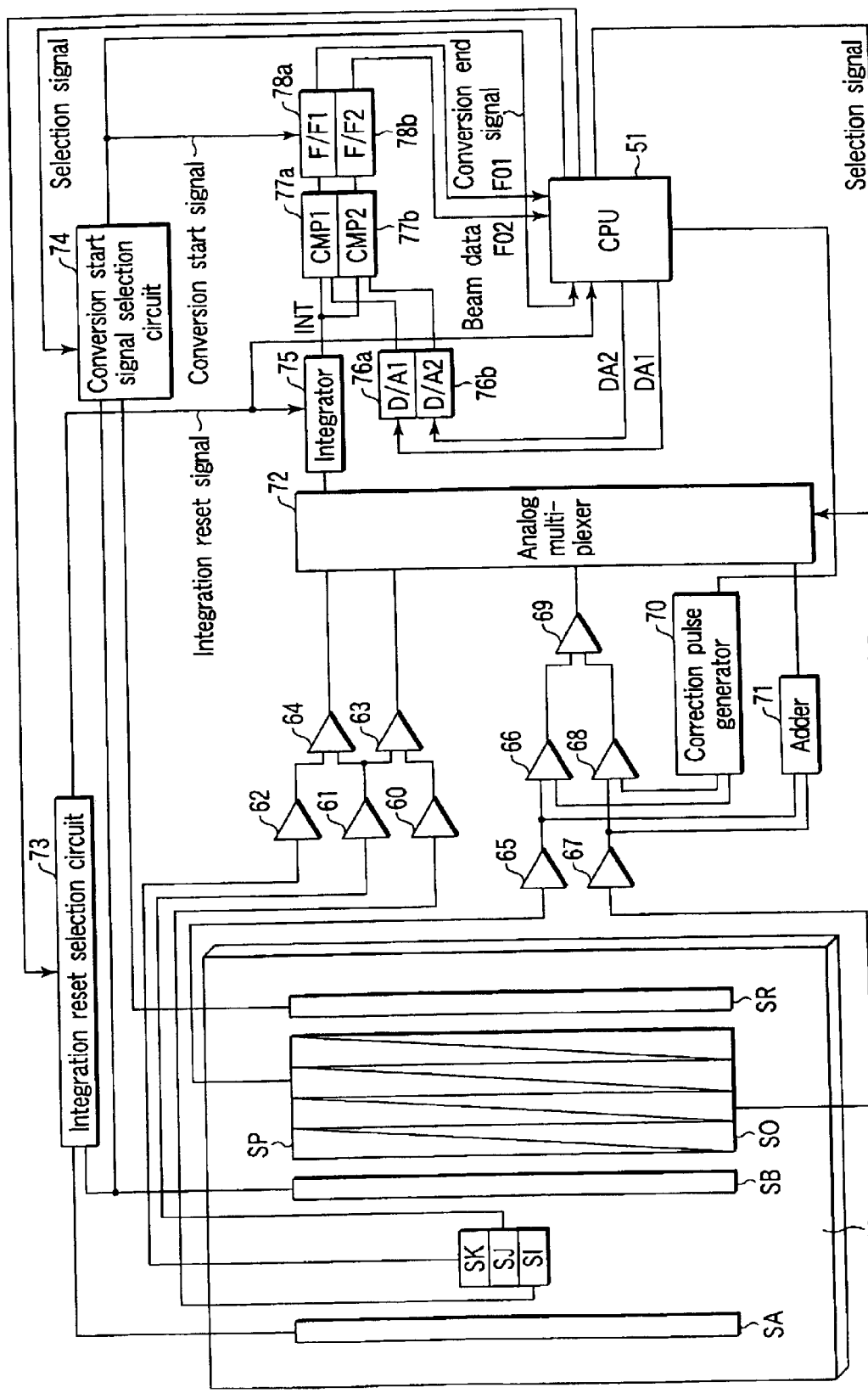
FIG. 13 is a block diagram showing the structure of the beam position detection circuit according to the second embodiment of the present invention.

FIG. 13 is a block diagram showing the structure of the beam position detection circuit according to the second embodiment. As compared to the beam position detection circuit shown in FIG. 6, D/A converters 76a and 76b, comparators 77a and 77b and flip-flops 78a and 78b are provided in place of the A/D converter 76 shown in FIG. 6.

In the circuit shown in FIG. 13, the two comparators 77a and 77b function as window comparators. The A/D conversion process with use of the window comparators will now be described briefly in connection with an example case where a beam position is to be judged by the sensors SP and SO.

An output terminal of the differential amplifier 69 is connected to the integrator 75 via the analog multiplexer 72. When a light beam passes through a sensor SB, the integrator 75 is reset. Then, the integration of the output signals from the differential amplifier 69 is started, and the integration output signal INT is supplied to the comparators 77a and 77b.

On the other hand, the CPU 51 assigns data DA1 and DA2 that correspond to a certain voltage range to the D/A converters 76a and 76b. The D/A converters 76a and 76b supply voltages Vt1 and Vt2 that correspond to the data DA1 and DA2 assigned by the CPU 51 to the comparators 77a and 77b. The comparator 77a compares the voltage Vt1 and the output signal INT of the integrator 75 with each other, and the comparator 77b compares the voltage Vt2 and the output signal INT of the integrator 75 with each other. The comparison results of the comparators 77a and 77b are latched at signal edge of detection signal output from the sensor SR by the flip-flops 78a and 78b when the light beam passes through the sensor SR, and then supplied to the CPU 51 as signals FO1 and FO2.

To summarize, the comparators 77a and 77b compare threshold values Vth1 and Vth2 input respectively from the D/A converters 76a and 76b, and the output INT (that is, an analog detection signal) from the integrator, with each other. The flip-flops 78a and 78b convert the comparative results of the comparators 77a and 77b into corresponding digital bits FO1 and FO2 when the light beam passes through the sensor SR.

The CPU 51 judges if the output voltage INT of the integrator 75 falls within the voltage range between Vth1 and Vth2 when the light beam passes through the sensor SR on the basis of the digital bits FO1 and FO2 from the flip-flops 78a and 78b. When the output signal INT of the integrator 75 falls within the voltage range between Vth1 and Vth2, the CPU 51 assigns new data DA1 and DA2 for narrowing the voltage range between Vth1 and Vth2, to the D/A converters 76a and 76b. In other words, the CPU 51 changes the threshold values input to the comparators on the basis of the digital bits.

The operation described above is repeated until the difference between the data DA1 and DA2 becomes such a small value that corresponds to a predetermined precision, and thus the CPU 51 judges the size of the output signal INT of the integrator 75 as DA1 or DA2. It should be noted here that the details of the A/D conversion method that uses comparators are described in the U.S. Pat. No. 6,392,684 that has been assigned to the same assignee as that of the present application.

When beam data (such as the beam passing position or the light amount (intensity) of the beam) is A/D-converted by means of the A/D conversion method that uses a comparator as described above, noise is created in many cases during switching of the output of the comparators, which causes an adverse effect on operations such as the main scanning control or image formation.

Comparators switches their outputs from H (High) to L (Low), or from L to H depending on the relationship in size between a threshold value and beam data to be compared (that is, an integration output from each detection portion). An output from the comparator is binary-value of H or L. In other words, when the power supply voltage of the comparator is 5V, H is 5V and L is 0V.

The beam detection system in which the A/D conversion method using a comparator is applied entails the following problem.

When the integration output that is the beam data has been A/D converted by means of the A/D conversion method using comparators, the integration output value and the threshold values inputted to the comparators are very close each other. The position where the scanning beam passes, for example, is finely vibrated at all times due to an influence of the surface inclination of the polygon mirror (angle error) or vibration. As a result, the output from the comparator vibrates vigorously as H→L→H→L. That is, in a state where a beam passing position has finally judged, the output from the comparator vibrates vigorously. As described above, the output from the comparator is binary value as H and L, and therefore it has a great influence on the analog signals. For example, in the case of a single power of 5V, it switches between 5V (H level) and 0V vigorously. Therefore, it is superimposed as noise on the analog signals of the timing sensors as sensor SA and the like, thereby inducing the malfunction and detection error. When detecting the light amount (intensity) of a light beam, a similar matter to the above occurs.

For example, conventionally, a series of operations are carried out in a sequence of the beam light amount control→sub-scanning beam passing position control→main scanning beam emitting time control→image formation. However, after the sub-scanning beam passing position control, the threshold value of the comparator is never changed from the value obtained at the final control. Therefore, as described above, the output from the comparator, in many cases, maintains its vigorously vibrating state. Therefore, the vibration is superimposed as noise on the power line and signal lines.

Generally, the sub-scanning beam passing position control circuit and main scanning control circuit are mounted on the same substrate. Therefore, in the main scanning control and the image formation, which are carried out after the sub-scanning beam passing position control, the vibration is superimposed on detection signals of the timing sensors and horizontal synchronous signal generating sensor (HSYNC sensor), thereby detection errors and malfunctions may occur. In the main scanning control, the operation in some cases does not finish normally, or finishes in the state of a detection error. As a result, a control error or a beam position error may occur in the main scanning control, thereby deteriorating the quality of the output image.

As a solution to the above-described problem, this embodiment carries out the followings. That is, in the case where the beam detection by means of the A/D conversion method that uses the comparator is not carried out, the threshold value of the comparator is changed from the final value at the time when the beam detection is carried out.

FIG. 14 is a flow of the operation from the beam control to image formation when the present invention is applied.

First, in STEP100, the CPU 51 adjusts the light amount (intensity) of the scanning beam to an optimal value for beam control. In the case of the multi-beam type, the light amounts of beams are controlled such that the light amounts of the beams are equalized to each other. In STEP101, the CPU 51 controls the beam passing position in the sub-scanning direction. In the case of the multi-beam type, the CPU 51 controls the pitch between scanning beams at a predetermined one.

In STEP102, the CPU 51 sets the threshold value finally set in STEP100 and STEP101 to a different value from the final value. (The details will be discussed later with reference to FIG. 15.) In STEP103, the CPU 51 controls the beam emission timing in the main scanning direction. In this routine, no comparator is used. It should be noted here that the details of the beam emission timing control in the same scanning direction are described in the U.S. Pat. No. 6,208,367 that has been assigned to the same assignee as that of the present application.

In STEP104, the CPU 51 carries out an image formation in accordance with the request made by the user, that is, copying or printing on the basis of the image data received via a communication network. Here, no comparator is used either.

Next, the routine for changing the threshold value of the comparator in STEP102 will now be described. FIG. 15 illustrates an example in which window comparators (two comparators) are used. Note that the same description can be applied for the case where one comparator is used.

In STEP105, the CPU 51 assigns the threshold value for the upper comparator to the D/A converter 76a for the upper comparator 77a. The D/A comparator 76a outputs an analog voltage as the threshold value of the upper comparator 77a on the basis of the assigned value by the CPU 51.

For example, in the case where the final threshold values of the comparators in STEP101 are as follows: the upper comparator: 5×512/1023 [V] and the lower comparator: 5×511/1023 [V] (power voltage: 5V and D/A converter resolution: 10 bits), immediately after the beams passing position control, the beam passing position is located within a range of about 5 mV defined by the upper and lower threshold values. However, as described above, the beam passing position vibrates and therefore it does not stay within a range of as narrows as about 5 mV, and each of the outputs of the comparator vibrates vigorously between H and L repeatedly as H→L→H→L.

In order to avoid the influence caused by this, the CPU 51 sets the threshold value of the upper comparator to 5V. In this manner, the output from the upper comparator is fixed always at H (or L), and therefore the induction of the noise can be avoided.

In STEP106, the CPU 51 assigns the threshold value to the D/A converter 76b for the lower comparator 77b. The D/A comparator 76b outputs an analog voltage as the threshold value of the lower comparator 77b on the basis of the assigned value by the CPU 51. That is, this time, the CPU 51 sets the threshold value of the lower comparator 77b to 0V. In this manner, the output from the lower comparator 77b is fixed always at H (or L), and therefore the induction of the noise can be avoided.

STEP105 and STEP106 indicate examples in which the window of the window comparator is widened as large as possible so as to prevent the vibration of the outputs from the comparators 77a and 77b in STEP103 in FIG. 14, or STEP 103 and STEP 104.

Next, the third embodiment will now be described.

The adverse effects of the case of the A/D conversion method that uses a comparator, on the main scanning control and image formation, which are caused by variation in the output of the comparator have been described in the above-provided embodiments.

A similar problem can occur in the A/D conversion process that uses a general A/D converter other than the case of the A/D conversion process that uses comparators such as described above. In general, an A/D converter requires a conversion start signal for determining at what timing an analog signal is converted into a digital signal when the analog signal is to be digitized. Further, the A/D converter outputs a "conversion end signal" to notify the CPU that a conversion is completed. Based on this signal, the CPU starts to take in outputs from the A/D converter.

In FIG. 13, as the conversion start signal, the output of the sensor SB is used when the sensors SI, SJ and SK are used in measurement, or the output of the sensor SR is used when the sensors SO and SP are used in measurement. A conversion start signal selection circuit 74 generates a conversion start signal each time the beam scans the beam detection apparatus 38. Meanwhile, with regard to a conversion end signal, in the case of a general A/D converter, the A/D converter itself has a function of generating the signal. However, what is shown in FIG. 13 is an A/D converter that uses a comparator, the output from the sensor SR is used for the conversion start signal. The outputs of the A/D converter are digital signals.

More specifically, in such a routine as shown in FIG. 14, STEP103 and STEP104, where no A/D converter is used, if the conversion of the A/D converter is set to be effective, the "conversion start signal" or "conversion end signal" described above is generated for each beam scanning, which is superimposed as noise on a analog detection signal of the beam passing timing sensors or the like. In this manner, malfunctions and detection errors are induced. As a result, a similar matter to that of the case of the comparator output described in connection with the second embodiment will occur.

Further, when the digital output from the A/D converter changes, it is highly possible that noise is induced in the analog detection signal system including the beam passing timing sensor. Particularly, in the case of a general A/D converter with parallel outputs, there is a possibility that output signals (naturally, digital signals) that correspond to the number of output bits are changed at once, and therefore its influence is even greater.

As a solution to the above-described problem, this embodiment takes the following measures. That is, in a sequence where the A/C converter is not used, the A/D converter is not operated so as not to generate the "conversion start signal" or "conversion end signal". Further, the "output signal of the A/D converter" is not changed. In this manner, the generation of the noise caused by these signals can be prevented.

Figure 16:
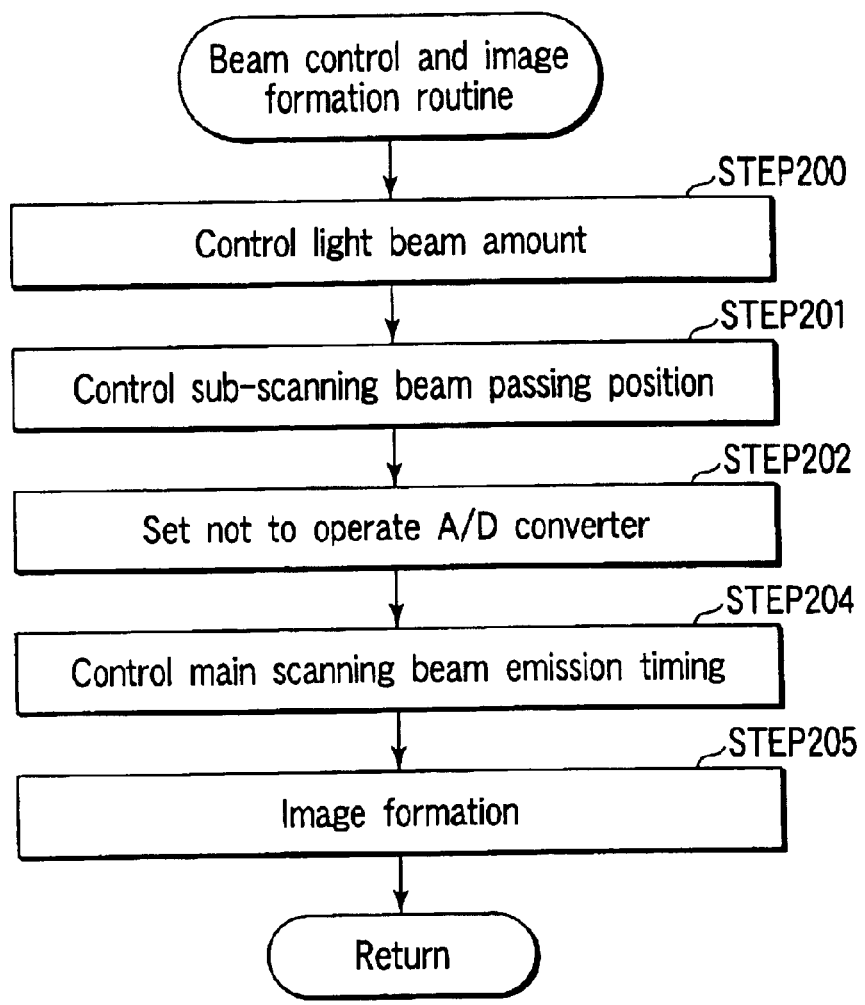
FIG. 16 is a flowchart illustrating the operation of the third embodiment of the present invention.

FIG. 16 is a flowchart that illustrates the operation of this embodiment.

In STEP204 and STEP205, the A/D converter is not used, and therefore the CPU 51 makes such setting that the A/D converter is not operated in STEP202.

More specifically, the CPU sets the selection signal to the analog multiplexer 72 such as not to select any one of the input terminals (output signals from the differential amplifiers). Further, the CPU sets the selection signal to the conversion start signal selection circuit such as not to select any one of the input terminals (output signals from the sensors). In this manner, the A/D converter is not operated, and therefore the output signal from the A/D converter is not changed.

As described above, according to this embodiment, noise is not induced in the analog signal system including the beam passing timing sensor output signals, and therefore there is not adverse influence caused in the main scanning beam passing timing control (STEP204) and image formation (STEP205). Therefore, it is possible to form an image free of beam position errors in the main scanning direction.

What is claimed is:

1. A light beam scanning apparatus comprising:
   a beam generating unit configured to generate a light beam;
   a scanning unit configured to reflect the light beam generated from the beam generating unit towards a surface to be scanned, and scan the light beam onto the surface to be scanned in a main scanning direction;
   a beam passing position detecting unit configured to detect a passing position of the light beam in a sub-scanning direction, which is scanned by the scanning unit and provide a position signal that indicates the passing position;
   a correcting unit configured to correct the position signal from the passing position detecting unit and provide corrected position signal; and
   an adjusting unit configured to adjust a correction amount of the correcting unit such that the corrected position signal falls within a target range, the target range being variable in accordance with the position of the light beam.

2. The light beam scanning apparatus according to claim 1, wherein the target range includes a first range and a second range that includes the first range and is larger than the first range.

3. The light beam scanning apparatus according to claim 2, wherein:
   the first range is set by a first threshold value and a second threshold value that is larger than the first threshold value;
   the second range is set by a third threshold value and a fourth threshold value that is larger than the third threshold value; and
   the adjusting unit adjusts the corrected position signal from the correcting unit to fall within the first range by adjusting the correction amount of the correcting unit such as to increase the corrected position signal, in a case where the corrected position signal is equal to or less than the first threshold value.

4. The light beam scanning apparatus according to claim 1, wherein:
   the first range is set by a first threshold value and a second threshold value that is larger than the first threshold value, and the second range is set by a third threshold value and a fourth threshold value that is larger than the third threshold value; and
   the adjusting unit adjusts the corrected position signal from the correcting unit to fall within the first range by adjusting the correction amount of the correcting unit such as to decrease the corrected position signal, in a case where the corrected position signal is equal to or larger than the first threshold value.

5. The light beam scanning apparatus according to claim 1, wherein the beam passing position detecting unit includes a integrator which integrates the corrected position signal corrected by the correction unit and outputs a integral value corresponding to the passing position of the light beam in a sub-scanning direction.

6. The light beam scanning apparatus according to claim 1, wherein
   the beam generating unit generates a plurality of light beams; and
   the scanning unit reflects said plurality of light beams towards the surface to be scanned, and scans the surface to be scanned with said plurality of light beams;
   the apparatus further comprising:
   a first position confirming unit, provided away from the beam passing position detecting unit in the main scanning direction and placed in a region that includes a first passing target position, configured to confirm that a light beam of the plurality of light beams passes the first passing target position;
   a second position confirming unit, provided in a region that includes a second passing target position situated away the first passing target position by a predetermined distance in the sub-scanning direction, configured to confirm that the light beam passes the second passing target position;
   a beam passing position changing unit configured to change the passing position of one or more light beams of said plurality of light beams in the sub-scanning direction;
   an operating unit configured to calculate a first difference between an output of the light beam passing position detecting unit when the light beam passes through the first passing target position and an output of the light beam passing position detecting unit when the light beam passes through the second passing target position; and
   a controlling unit configured to control the beam passing position changing unit based on a second difference between outputs of the beam passing position detecting unit for a first light beam and a second light beam of said plurality of light beams, and the first difference, thereby changing the passing position of the second beam.

7. The light beam scanning apparatus according to claim 6, wherein the beam passing position changing unit can change the passing position of each of the light beams other than the first light beam, and the first light beam is a fixed light beam whose position in the sub-scanning direction is fixed.

8. A light beam scanning apparatus comprising:
   a beam generating unit configured to generate a light beam;

a scanning unit configured to reflect the light beam generated from the beam generating unit towards a surface to be scanned, and scan the light beam onto the surface to be scanned in a main scanning direction;

a beam detecting unit including a beam passing position detecting unit configured to detect a passing position of the light beam in a sub-scanning direction, and a light amount detecting unit configured to detect an amount of light of the light beam emitted from the beam generating unit, configured to output analog detection signals from the beam passing position detecting unit and the light amount detecting unit non-simultaneously;

a converting unit including a comparator configured to compare an input threshold value and the analog detection signal with each other, configured to convert the analog detection signal output by the detection unit by using the comparator, into a corresponding digital bit;

a changing unit configured to change the threshold value input to the comparator based on the digital bit;

providing unit configured to provide the threshold value changed by the changing unit to a respective one of the beam passing position detecting unit and the light amount detecting unit;

a timing control unit configured to control a timing of emission of the light beam scanned by the scanning unit; and a stopping unit configured to stop an operation of the converting unit while the light emission timing is being controlled by the timing control unit.

9. The light beam scanning apparatus according to claim 8, wherein the stopping unit stops the operation of the converting unit by changing the threshold value of the comparator to one of a maximum value and minimum value that can be input to a comparator input terminal of the comparator.

10. The light beam scanning apparatus according to claim 8, wherein the beam generating unit generates a plurality of light beams; and the scanning unit reflects said plurality of light beams towards the surface to be scanned, and scans the surface to be scanned with said plurality of light beams;

the apparatus further comprising:

a first position confirming unit, provided away from the beam passing position detecting unit in the main scanning direction and placed in a region that includes a first passing target position, configured to confirm that a light beam of the plurality of light beams passes the first passing target position;

a second position confirming unit, provided in a region that includes a second passing target position situated away the first passing target position by a predetermined distance in the sub-scanning direction, configured to confirm that the light beam passes the second passing target position;

a beam passing position changing unit configured to change the passing position of one or more light beams of said plurality of light beams in the sub-scanning direction;

an operating unit configured to calculate a first difference between an output of the light beam passing position detecting unit when the light beam passes through the first passing target position and an output of the light beam passing position detecting unit when the light beam passes through the second passing target position; and a controlling unit configured to control the beam passing position changing unit based on a second difference between outputs of the beam passing position detecting unit for a first light beam and a second light beam of said plurality of light beams, and the first difference, thereby changing the passing position of the second beam.

11. The light beam scanning apparatus according to claim 9, wherein the beam passing position changing unit can change the passing position of each of the light beams other than the first light beam, and the first light beam is a fixed light beam whose position in the sub-scanning direction is fixed.

12. A light beam scanning apparatus comprising:

a beam generating unit configured to generate a light beam;

a scanning unit configured to reflect the light beam generated from the beam generating unit towards a surface to be scanned, and scan the light beam onto the surface to be scanned in a main scanning direction;

a beam detecting unit including a beam passing position detecting unit configured to detect a passing position of the light beam in a sub-scanning direction, and a light amount detecting unit configured to detect an amount of light of the light beam emitted from the beam generating unit, configured to output analog detection signals from the beam passing position detecting unit and the light amount detecting unit non-simultaneously;

an analog/digital converting unit configured to convert the analog detection signal output from the detecting unit into a corresponding digital value;

providing unit configured to provide the digital value converted by the analog/digital converting unit to a respective one of the beam passing position detecting unit and the light amount detecting unit;

a timing control unit configured to control a timing of emission of the light beam scanned by the scanning unit; and a stopping unit configured to stop an operation of the converting unit while the light emission timing is being controlled by the timing control unit.

13. The light beam scanning apparatus according to claim 12, wherein the stopping unit stops supply of a conversion start signal to the analog/digital converting unit.

14. The light beam scanning apparatus according to claim 12, wherein the beam generating unit generates a plurality of light beams; and the scanning unit reflects said plurality of light beams towards the surface to be scanned, and scans the surface to be scanned with said plurality of light beams;

the apparatus further comprising:

a first position confirming unit, provided away from the beam passing position detecting unit in the main scanning direction and placed in a region that includes a first passing target position, configured to confirm that a light beam of the plurality of light beams passes the first passing target position;

a second position confirming unit, provided in a region that includes a second passing target position situated away the first passing target position by a predetermined distance in the sub-scanning direction, configured to confirm that the light beam passes the second passing target position;

a beam passing position changing unit configured to change the passing position of one or more light beams of said plurality of light beams in the sub-scanning direction;

an operating unit configured to calculate a first difference between an output of the light beam passing position detecting unit when the light beam passes through the first passing target position and an output of the light beam passing position detecting unit when the light beam passes through the second passing target position; and a controlling unit configured to control the beam passing position changing unit based on a second difference between outputs of the beam passing position detecting unit for a first light beam and a second light beam of said plurality of light beams, and the first difference, thereby changing the passing position of the second beam.

15. The light beam scanning apparatus according to claim 14, wherein the beam passing position changing unit can change the passing position of each of the light beams other than the first light beam, and the first light beam is a fixed light beam whose position in the sub-scanning direction is fixed.

16. A light beam scanning apparatus comprising:

a beam generating unit configured to generate a light beam;

a scanning unit configured to reflect the light beam generated from the beam generating unit towards a surface to be scanned, and scan the light beam onto the surface to be scanned in a main scanning direction;

a light amount detecting unit configured to detect an amount of light of the light beam emitted from the beam generating unit, and provide a first analog detection signal;

a beam passing position detecting unit configured to detect a passing position of the light beam in a sub-scanning direction, which is scanned by the scanning unit and provide a second analog detection position signal that indicates the passing position; and a control unit including at least one of (a) to (c) controllers described below:

(a) controller comprising:

a correcting unit configured to correct the position signal from the passing position detecting unit; and an adjusting unit configured to adjust a correction amount of the correcting unit such that the signal of the beam passing position in the sub-scanning direction falls within a target range, the target range being variable in accordance with the position of the light beam;

(b) controller comprising:

an outputting unit configured to output analog detection signals from the light amount detecting unit and the beam passing position detecting unit non-simultaneously;

a converting unit including a comparator configured to compare an input threshold value and the analog detection signal from the outputting unit with each other, configured to convert the analog detection signal output by the outputting unit by using the comparator, into a corresponding digital bit;

a changing unit configured to change the threshold value input to the comparator based on the digital bit;

providing unit configured to provide the threshold value changed by the changing unit to a respective one of the beam passing position detecting unit and the light amount detecting unit;

a timing control unit configured to control a timing of emission of the light beam scanned by the scanning unit; and a stopping unit configured to stop an operation of the converting unit while the light emission timing is being controlled by the timing control unit; and (c) controller comprising:

an outputting unit configured to output analog detection signals from the light amount detecting unit and the beam passing position detecting unit non-simultaneously;

an analog/digital converting unit configured to convert the analog detection signal output from the outputting unit into a corresponding digital value;

providing unit configured to provide the digital value converted by the analog/digital converting unit to a respective one of the beam passing position detecting unit and the light amount detecting unit;

a timing control unit configured to control a timing of emission of the light beam scanned by the scanning unit; and a stopping unit configured to stop an operation of the converting unit while the light emission timing is being controlled by the timing control unit; and an image forming unit configured to form an image corresponding to input image data by modulating a drive signal for driving the beam generating unit in accordance with the input image data and scanning the surface to be scanned by using the scanning unit with a modulated light beam.

* * * * *